US008829739B2

(12) United States Patent
Okubo et al.

(10) Patent No.: US 8,829,739 B2
(45) Date of Patent: Sep. 9, 2014

(54) POWER CONVERTER FOR VEHICLE

(75) Inventors: Takuya Okubo, Takahama (JP);
Tsuyoshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 173 days.

(21) Appl. No.: 13/553,954

(22) Filed: Jul. 20, 2012

(65) Prior Publication Data

US 2013/0021017 A1  Jan. 24, 2013

(30) Foreign Application Priority Data

Jul. 21, 2011   (JP) ................................. 2011-159644

(51) Int. Cl.
| | |
|---|---|
| H01H 9/54 | (2006.01) |
| H01H 33/59 | (2006.01) |
| H01H 47/00 | (2006.01) |
| H01H 85/46 | (2006.01) |
| H01H 3/26 | (2006.01) |
| H01H 3/28 | (2006.01) |

(52) U.S. Cl.
USPC ........................... 307/140; 307/9.1; 307/10.1

(58) Field of Classification Search
CPC ............ B60L 11/1816; B60L 2210/14; B60L 2240/547; Y02T 10/7005; Y02T 10/7044; Y02T 10/7077; Y02T 10/70; Y02T 90/16; H02M 3/1582
USPC ............................. 307/9.1, 10.1, 72, 140, 150
See application file for complete search history.

(56) References Cited

U.S. PATENT DOCUMENTS

| | | | |
|---|---|---|---|
| 5,583,751 A | | 12/1996 | Nakazawa et al. |
| 5,994,789 A | * | 11/1999 | Ochiai ......................... 307/10.1 |
| 2004/0179378 A1 | | 9/2004 | Tamura |
| 2005/0047175 A1 | | 3/2005 | Kawasaki et al. |

FOREIGN PATENT DOCUMENTS

| | | |
|---|---|---|
| JP | 55-029234 | 3/1980 |
| JP | 7-87601 | 3/1995 |
| JP | 2004-297994 | 10/2004 |
| JP | 2005-051994 | 2/2005 |
| JP | 2006-296049 | 10/2006 |

OTHER PUBLICATIONS

Office Action (7 pages) dated May 6, 2014, issued in corresponding Chinese Application No. 201210250512.4 and English translation (10 pages).

* cited by examiner

*Primary Examiner* — Carlos Amaya
(74) *Attorney, Agent, or Firm* — Nixon & Vanderhye PC

(57) ABSTRACT

A power converter capable of activating a control circuit therein without increasing a length of a wiring for conveying an external activation signal. In the power converter, a converter circuit isolates a first voltage of a first power supply, converts the first voltage into a second voltage, and outputs the second voltage to a second power supply. A first power supply connecting circuit connects the first power supply to the converter circuit in response to the activation signal. An activation circuit determines whether or not the activation signal has been received by the first power supply connecting circuit on the basis of a voltage between input terminals of the converter circuit and activates the control circuit when it is determined that the activation signal has been received by the first power supply connecting circuit.

7 Claims, 1 Drawing Sheet

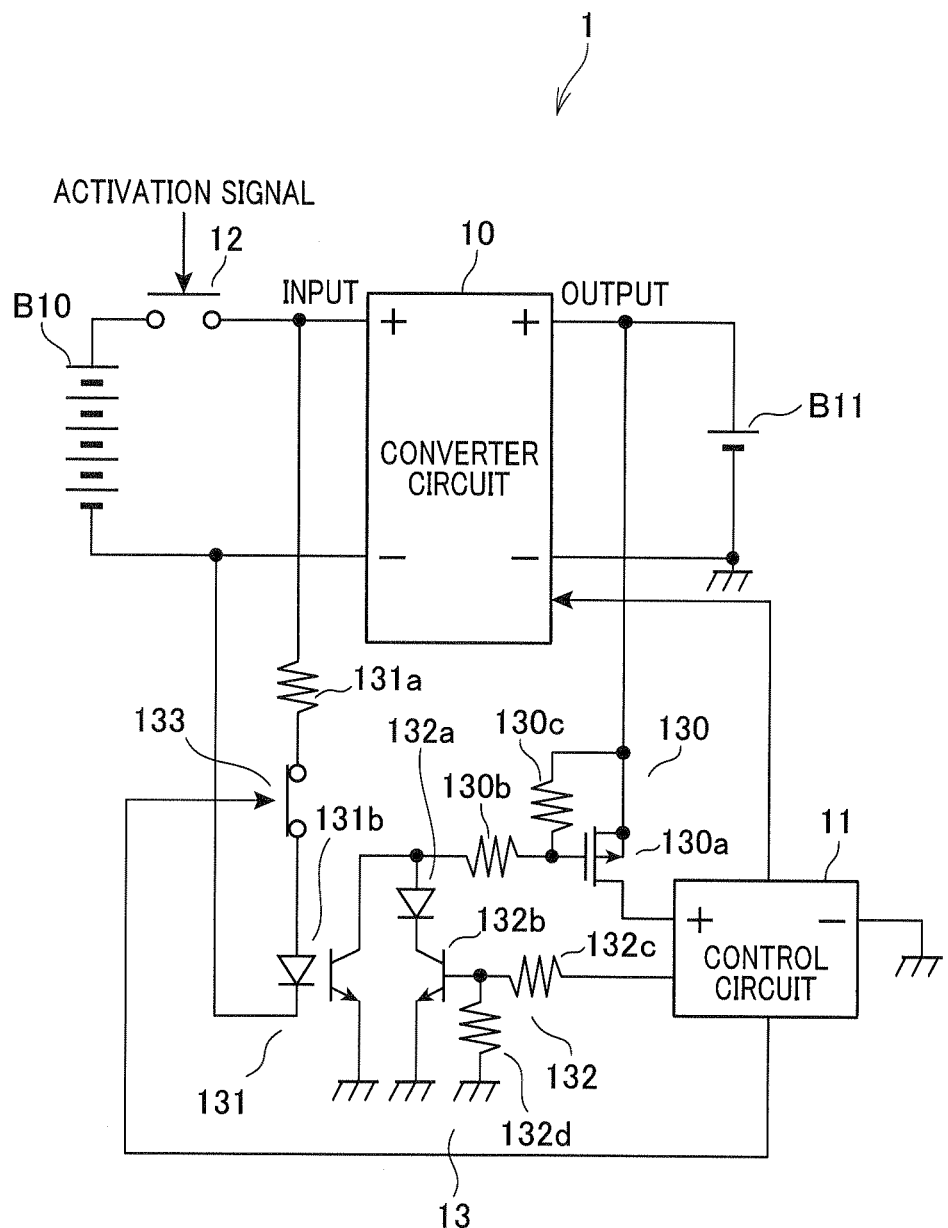

POWER CONVERTER FOR VEHICLE

CROSS-REFERENCE TO RELATED APPLICATION

This application is based on and claims the benefit of priority from earlier Japanese Patent Application No. 2011-159644 filed Jul. 21, 2011, the description of which is incorporated herein by reference.

BACKGROUND

1. Technical Field

This invention relates to a power converter for a vehicle.

2. Related Art

A known power converter includes a power supply unit for an electrical vehicle as disclosed in Japanese Patent Application Laid-Open Publication No. H7-087601.

The disclosed power supply unit for an electrical vehicle, which includes an activation circuit, a transformer, a switching circuit, and a rectifying-smoothing circuit, is activated upon turn on of a main switch, isolates and steps down a high direct-current (DC) voltage of a main power supply (power supply for travelling), and supplies the stepped down voltage to an accessory power supply of low DC voltage. The main power supply supplies the high DC voltage to a traction motor. The accessory power supply supplies the low DC voltage to a control unit or a vehicle light or the like.

Upon turn on of the main switch, the activation circuit connects the main power supply to the switching circuit to activate the switching circuit, and connects the main power supply to the transformer. The switching circuit is activated upon application of the high DC voltage of the main power supply to the switching circuit, converts the high DC voltage into an alternate-current (AC) voltage through switching of the switching circuit, and supplies the AC voltage to a primary winding of the transformer. The transformer isolates and steps down the AC voltage applied to the primary winding of the transformer, and outputs the stepped down AC voltage from a secondary winding of the transformer. The rectifying-smoothing circuit converts the stepped down AC voltage outputted from the secondary winding of the transformer into a low DC voltage to supply the low DC voltage to the accessory power supply.

That is, in the disclosed power supply unit for an electrical vehicle, the main power supply is electrically connected to the switching circuit via the activation circuit to activate the switching circuit. Thereafter, the main power supply is electrically connected to the transformer, where the AC voltage converted from the high DC voltage by the switching circuit is isolated and stepped down to supply to the low DC voltage to the accessory power supply through the rectifying-smoothing circuit.

However, the disclosed power supply unit for an electrical vehicle has a disadvantage that since the switching circuit is activated upon application of the high DC voltage of the main power supply, a component of the switching circuit to which the high DC voltage is applied has to withstand high-voltages. This leads to an increase of manufacturing costs.

There is another kind of power supply unit for an electrical vehicle, where a switching circuit is activated upon application of a low DC voltage of an accessory power supply to the switching circuit. Such a power supply unit for an electrical vehicle, however, has to include an activation circuit that connects the accessory power supply to the switching circuit upon turn on of a main switch to activate the switching circuit, where information about a state of the main switch has to be conveyed to the activation circuit. Hence, a length of a wiring for conveying the information about a state of the main switch is increased with a longer distance from the main switch to the activation circuit, which leads to an increase in manufacturing costs.

In consideration of the foregoing, exemplary embodiments of the present invention are directed to providing a power converter capable of activating a control circuit without increasing a length of a wiring for conveying an activation signal, where the control circuit is activated when electrically connected to a low voltage power supply in response to the activation signal.

SUMMARY

In accordance with an exemplary embodiment of the present invention, there is provided a power converter including: a converter circuit that isolates a first voltage of a first power supply applied between input terminals of the converter circuit, converts the first voltage into a second voltage that is different from the first voltage, and outputs the second voltage from output terminals of the converter circuit to a second power supply; a control circuit that is powered by the second power supply and controls the converter circuit; a first power supply connecting circuit that connects the first power supply to the input terminals of the converter circuit in response to an external activation signal; and an activation circuit that connects the second power supply to the control circuit to activate the control circuit in response to the activation signal. The activation circuit is adapted to determine whether or not the activation signal has been received by the first power supply connecting circuit on the basis of a voltage between the input terminals of the converter circuit and activate the control circuit when it is determined that the activation signal has been received by the first power supply connecting circuit.

With this configuration, a status of the activation signal, e.g., whether or not the activation signal has been received by the first power supply connecting circuit, can be determined on the basis of a voltage between input terminals of the converter circuit, which allows the control circuit to be activated without increasing a length of a wiring for conveying the activation signal.

BRIEF DESCRIPTION OF THE DRAWINGS

In the accompanying drawings:

FIG. 1 shows a schematic circuit diagram of a power converter in accordance with one embodiment of the present invention.

DESCRIPTION OF SPECIFIC EMBODIMENTS

The present invention will be described more fully hereinafter with reference to the accompanying drawing. The present invention is exemplarily applied to a power converter mounted in a vehicle, where a DC voltage of a high-voltage battery is isolated and stepped down to be supplied to a low-voltage battery.

There will now be explained a power converter in accordance with one embodiment of the present embodiment with reference to FIG. 1. FIG. 1 shows a schematic circuit diagram of the power converter.

Referring to FIG. 1, the power converter 1 is adapted to isolate and step down a high direct-current (DC) voltage (a first voltage) of a high-voltage battery B10 (a first power supply) to supply a low DC voltage (a second voltage) lower than the high DC voltage to a low-voltage battery B11 (a second power supply). The high-voltage battery B10 is a power supply for driving a vehicle drive motor (not shown). A low-voltage battery B11 is a power supply for driving a control unit or a vehicle light or the like mounted in a vehicle. A negative terminal of the high-voltage battery B10 is floating isolated from a vehicle body. A negative terminal of the low-voltage battery B11 is electrically connected to the vehicle body. The power converter 1 includes a converter circuit 10, a control circuit 11, a main switch 12 (a first power supply connecting circuit), and an activation circuit 13.

The converter circuit 10, which is a well-known isolated converter circuit including a switching element and a transformer, is adapted to isolate and step down a voltage applied by the high-voltage battery B10 between input terminals of the converter circuit 10 and then output a low DC voltage from output terminals of the converter circuit 10 to supply the low DC voltage to the low-voltage battery B11. Positive and negative input terminals of the converter circuit 10 are electrically connected to a main switch 12 and a negative terminal of the high-voltage battery B10, respectively. Positive and negative output terminals of the converter circuit 10 are electrically connected to positive and negative terminals of the low-voltage battery B11, respectively. In addition, a control terminal of the converter circuit 10 is electrically connected to the control circuit 11.

The control circuit 11 is activated upon application of a low DC voltage of the low-voltage battery B11 to the control circuit 11 and controls the converter circuit 10. After activation, the control circuit 11 controls the activation circuit 13 to maintain electrical connection between the low-voltage battery B11 and the control circuit 11. After establishment of the electrical connection between the low-voltage battery B11 and the control circuit 11, the control circuit 11 controls the activation circuit 13 to electrically disconnect the activation circuit 13 from the input terminals of the converter circuit 10. The positive and negative electrode power supply terminals of the control circuit 11 are electrically connected to the activation circuit 13 and the vehicle body, respectively. One of two control terminals of the control circuit 11 is electrically connected to the converter circuit 10 and the other to the activation circuit 13.

The main switch 12 is adapted to connect the high-voltage battery B10 to one of the input terminals (the positive input terminal in the embodiment) of the converter circuit 10 in response to an external activation signal. More specifically, the main switch 12 is normally in its off-state. Upon reception of the activation signal, the main switch 12 is turned on and connects the positive terminal of the high-voltage battery B10 to the positive input terminal of the converter circuit 10. In the present embodiment, one end of the main switch 12 is electrically connected to the positive input terminal of the converter circuit 10 and the other end of the main switch 12 is electrically connected to the positive terminal of the high-voltage battery B10. A control terminal of the main switch 12 receives the activation signal.

The activation circuit 13 is adapted to connect the low-voltage battery B11 to the control circuit 11 to activate the control circuit 11 in response to the activation signal. More specifically, the activation circuit 13 determines whether or not the activation signal has been received by the main switch 12 (i.e., a status of the activation signal) on the basis of a voltage between the positive and negative input terminals of the converter circuit 10 and activates the control circuit 11 when it is determined that the activation signal has been received by the main switch 12. The activation circuit 13 includes a low-voltage battery connecting circuit 130 (a second power-supply connecting circuit), a first drive circuit 131, a second drive circuit 132, and a disconnection switch 133 (a disconnection circuit).

The low-voltage battery connecting circuit 130, which includes a FET 130a and resistors 130b, 130c, is adapted to connect the low-voltage battery B11 to the control circuit 11. A source of the FET 130a is electrically connected to a positive terminal of the low-voltage battery B11 and a drain of the FET 130a is electrically connected to the positive electrode power supply terminal of the control circuit 11. A gate of the FET 130a is electrically connected to the first drive circuit 131 and the second drive circuit 132 via the resistor 130b. The resistor 130c is electrically connected between the gate and source of the FET 130a. Resistance values of the respective resistors 130b, 130c are set such that upon electrical connection of one end of the resistor 130b (other than the end of the resistor 130b connected to the gate of the FET 130a) to the vehicle body a low DC voltage of the low-voltage battery B11 divided by the resistors 130b, 130c is applied to the gate of the FET 130a and the FET 130a is thereby turned on.

The first drive circuit 131, which includes a resistor 131a and a photocoupler 131b, is adapted to determine whether or not the activation signal has been received by the main switch 12 on the basis of a voltage between the positive and negative input terminals of the converter circuit 10 and drive the low-voltage battery connecting circuit 130 when it is determined that the activation signal has been received by the main switch 12. More specifically, when a voltage between the positive and negative input terminals of the converter circuit 10 exceeds a predetermined voltage, then the first drive circuit 131 determines that the activation signal has been received by the main switch 12 and drives the low-voltage battery connecting circuit 130 to connect the low-voltage battery B11 to the control circuit 11. One end of the resistor 131a is electrically connected to the positive input terminal of the converter circuit 10, and the other end of the resistor 131a is electrically connected to the photocoupler 131b via the disconnection switch 133. An anode of a light-emitting diode of the photocoupler 131b is electrically connected to the other end of the resistor 131a via the disconnection switch 133. A cathode of the light-emitting diode of the photocoupler 131b is electrically connected to the negative input terminal of the converter circuit 10. A collector and an emitter of a phototransistor of the photocoupler 131b are electrically connected to one end of the resistor 130b (other than the end of the resistor 130b connected to the gate of the FET 130a) and the vehicle body, respectively. A resistance value of the resistor 131a is set such that upon application of the high DC voltage of the high-voltage battery B10 between the input terminals of the converter circuit 10 the light-emitting diode of the photocoupler 131b emits light and the phototransistor can thereby be turned on.

The second drive circuit 132, which includes a diode 132a, a transistor 132b, and resistors 132c, 132d, is adapted to drive the low-voltage battery connecting circuit 130 in response to a connection maintaining instruction from the control circuit 11, which is an instruction for maintaining electrical connection between the low-voltage battery B11 and the control circuit 11. More specifically, after activation of the control circuit 11 and upon reception of the connection maintaining instruction from the control circuit 11, the second drive circuit 132 drives the low-voltage battery connecting circuit 130 to maintain the electrical connection between the low-voltage battery B11 and the control circuit 11. An anode and a cathode of the diode 132a are electrically connected to one end of the resistor 130b (other than the end of the resistor 130b connected to the gate of the FET 130*a*) and the transistor 132*b*, respectively. A collector and an emitter of the transistor 132*b* are electrically connected to the cathode of the diode 132*a* and the vehicle body, respectively. A base of the transistor 132*b* is electrically connected to a control terminal of the control circuit 11 via the resistor 132*c*. The base of the transistor 132*b* is further electrically connected to the vehicle body via the resistor 132*d*. Resistance values of the respective resistors 132*c*, 132*d* are set such that when a predetermined voltage is applied to one end of the resistor 132*c* by the control circuit 11 the predetermined voltage divided by the resistors 130*b*, 130*c* is applied to the base of the transistor 132*b* and the transistor 132*b* can thereby be turned on.

The disconnection switch 133 is adapted to disconnect the first drive circuit 131 electrically connected to the input terminals of the converter circuit 10 therefrom in response to a disconnecting instruction from the control circuit 11, which an instruction for disconnecting the first drive circuit 131 from the input terminals of the converter circuit 10. More specifically, the disconnection switch 133 is normally in its on-state. Upon reception of the disconnecting instruction during maintaining the electrical connection between the control circuit 11 and the low-voltage battery B11, the disconnection switch 133 is turned off to disconnect the first drive circuit 131 from the input terminals of the converter circuit 10. One end of the disconnection switch 133 is electrically connected to one end of the resistor 131*a* (other than the end of the resistor 131*a* connected to the positive input terminal of the converter circuit 10), and the other end of the disconnection switch 133 is electrically connected to the anode of the light-emitting diode of the photocoupler 131*b*.

There will now be explained an operation of the power converter 1 with reference to FIG. 1.

When an ignition switch (not shown) of the vehicle is turned on, an activation signal is generated by an external device (not shown). Upon reception of the activation signal from the external device, the main switch 12 is turned on to connect the high-voltage battery B10 to the converter circuit 10, which allows a high DC voltage of the high-voltage battery B10 to be applied between the input terminals of the converter circuit 10. Upon application of the high DC voltage of the high-voltage battery B10 between the input terminals of the converter circuit 10, an electrical current flows into the light-emitting diode of the photocoupler 131*b* through the resistor 131*a* and the disconnection switch 133, which triggers the light-emitting diode to emit light. This leads to turning on of the phototransistor of the photocoupler 131*b*. Upon turn on of the phototransistor of the photocoupler 131*b*, one end of the resistor 130*b* is electrically connected to the vehicle body, and the low DC voltage of the low-voltage battery B11 is divided by the resistors 130*b*, 130*c*. Upon application of the divided voltage to the gate of the FET 130*a*, the FET 130*a* is turned on. The low DC voltage of the low-voltage battery B11 is thereby applied to the positive electrode power supply terminal of the control circuit 11, which leads to activation of the control circuit 11.

After activation of the control circuit 11, the control circuit 11 applies a predetermined voltage to one end of the resistor 132*c*. The predetermined voltage is divided by the resistors 132*c*, 132*d*. Upon application of the divided voltage to the base of the transistor 132*b*, the transistor 132*b* is turned on. One end of the resistor 130*b* is thereby electrically connected to the vehicle body regardless of whether the phototransistor of photocoupler 131*b* is in its on or off state, and the on-state of the FET 130*a* will be maintained. Electrical connection between the low-voltage battery B11 and the control circuit 11 is thus allowed to be maintained.

After establishment of continuous electrical connection between the control circuit 11 and the low-voltage battery B11, the control circuit 11 turns off the disconnection switch 133 to disconnect the first drive circuit 131 from the input terminals of the converter circuit 10.

Thereafter, the control circuit 11 controls the converter circuit 10 to isolate and step down the high DC voltage of the high-voltage battery B10, thereby supplying a low DC voltage to the low-voltage battery B11.

There will now be explained some advantage of the power converter 1 in accordance with the above embodiment with reference to FIG. 1.

In the above embodiment, the activation circuit 13 determines whether or not the activation signal has been received by the main switch 12 on the basis of a voltage between the input terminals of the converter circuit 10. This makes it possible to activate the control circuit 11 without increasing a length of a wiring for conveying the activation signal in such a vehicle-mounted power converter 1 that isolates and steps down a high DC voltage of the high-voltage battery B10 to supply to a low DC voltage to the low-voltage battery B11.

In the above embodiment, the activation circuit 13 includes the low-voltage battery connecting circuit 130 adapted to connect the low-voltage battery B11 to the control circuit 11, and the first drive circuit 131 adapted to determine whether or not the activation signal has been received by the main switch 12 on the basis of a voltage between the input terminals of the converter 10 and drive the low-voltage battery connecting circuit 130 when it is determined that the activation signal has been received by the main switch 12. This makes it possible to activate the control circuit 11 reliably on the basis of the activation signal.

Further, in the above embodiment, the activation circuit 13 includes the second drive circuit 132 adapted to drive the low-voltage battery connecting circuit 130 in response to the instruction (connection maintaining instruction) from the control circuit 11. After activation of the control circuit 11, the control circuit 11 controls the second drive circuit 132 to drive the low-voltage battery connecting circuit 130 so as to maintain electrical connection between the low-voltage battery B11 and the control circuit 11. Hence, even when a voltage between the input terminals of the converter circuit 10 (i.e., a high DC voltage of the high-voltage battery B10) varies with time or the first drive circuit 131 malfunctions due to switching noise or the like of the converter circuit 10 after activation of the control circuit 11, the control circuit 11 can maintain electrical connection between the low-voltage battery B11 and the control circuit 11. In addition, since the control circuit 11 is not adversely affected by the switching noise or the like, the first drive circuit 131 doesn't have to be disposed away from the converter circuit 10. The drive circuit 131 is thus allowed to be disposed in an arbitrary position.

In addition, in the above embodiment, the activation circuit 13 includes the disconnection switch 133 adapted to disconnect the first drive circuit 131 electrically connected to the input terminals of the converter circuit 10 from the input terminals of the converter circuit 10. After continuous electrical connection between the low-voltage battery B11 and the control circuit 11 is established, the control circuit 11 controls the disconnection switch 133 to disconnect the first drive circuit 131 from the input terminals of the converter circuit 10. This leads to suppression of a waste of power consumption of the first drive circuit 131 after activation of the control circuit 11.

In the above embodiment, the converter circuit 10 is so called a buck converter circuit. Alternatively, the converter circuit 10 may be a buck-boost converter circuit, where the converter circuit 10 isolates the low DC voltage of the low-voltage battery B11, converts the low DC voltage into the high DC voltage, and outputs the high DC voltage to the high-voltage battery B10. This enables not only power supply from the high-voltage battery B10 to the low-voltage battery B11, but also power supply from the low-voltage battery B11 to the high-voltage battery B10. Still alternatively, the converter circuit 10 may be a boost converter circuit. This enables not power supply from the high-voltage battery B10 to the low-voltage battery B11, but power supply from the low-voltage battery B11 to the high-voltage battery B10.

In the above embodiment, the FET 130*a* is used in the activation circuit 13, and the transistor 132*b* is used in the second drive circuit 132. Alternatively, each of the FET 130*a* and the transistor 132*b* may be replaced with any other kind of switching element or switch.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A power converter comprising:
   a converter circuit that isolates a first voltage of a first power supply applied between input terminals of the converter circuit, converts the first voltage into a second voltage that is different from the first voltage, and outputs the second voltage from output terminals of the converter circuit to a second power supply;
   a control circuit that is powered by the second power supply and controls the converter circuit;
   a first power supply connecting circuit that connects the first power supply to the input terminals of the converter circuit in response to an external activation signal; and
   an activation circuit that connects the second power supply to the control circuit to activate the control circuit in response to the activation signal,
   wherein the activation circuit determines whether or not the activation signal has been received by the first power supply connecting circuit on the basis of a voltage between the input terminals of the converter circuit and activates the control circuit when it is determined that the activation signal has been received by the first power supply connecting circuit.

2. The power converter of claim 1, wherein the activation circuit comprises:
   a second power-supply connecting circuit that connects the second power supply to the control circuit; and
   a first drive circuit electrically connected to the input terminals of the converter circuit, the first drive circuit being adapted to determine whether or not the activation signal has been received by the first power supply connecting circuit on the basis of a voltage between the input terminals of the converter circuit and drive the second power-supply connecting circuit to connect the second power supply to the control circuit when it is determined that the activation signal has been received by the first power supply connecting circuit.

3. The power converter of claim 2, wherein
   the activation circuit further comprises a second drive circuit that drives the second power-supply connecting circuit in response to a connection maintaining instruction from the control circuit, the connection maintaining instruction being an instruction for maintaining electrical connection between the second power supply and the control circuit, and
   after the control circuit is activated, the control circuit controls the second drive circuit through the connection maintaining instruction to drive the second power-supply connecting circuit so as to maintain the electrical connection between the second power supply and the control circuit.

4. The power converter of claim 3, wherein
   the activation circuit further comprises a disconnection circuit that disconnects the first drive circuit from the input terminals of the converter circuit in response to a disconnecting instruction from the control circuit, and
   during maintaining the electrical connection between the second power supply and the control circuit, the control circuit controls the disconnection circuit through the disconnecting instruction to disconnect the first drive circuit from the input terminals of the converter circuit.

5. The power converter of claim 1, wherein the converter circuit is further adapted to isolate the second voltage of the second power supply, convert the second voltage into the first voltage that is different from the second voltage, and output the first voltage to the first power supply.

6. The power converter of claim 1, wherein the power converter is mounted in a vehicle.

7. The power converter of claim 1, wherein
   the first voltage is a high DC voltage, the first power supply is a high-voltage battery, the second voltage is a low DC voltage that is lower than the high DC voltage, and the second power supply is a low-voltage battery, and
   the control circuit is powered by the low-voltage battery.

* * * * *